(12) United States Patent
Rospierski

(10) Patent No.: US 10,376,917 B2
(45) Date of Patent: Aug. 13, 2019

(54) RETRACTABLE NOZZLE FOR DOSING OR DISPENSING HIGH VISCOSITY MATERIALS

(71) Applicant: Ecolab USA Inc., St. Paul, MN (US)

(72) Inventor: Jeffrey J. Rospierski, Alden, NY (US)

(73) Assignee: Ecolab USA Inc., St. Paul, MN (US)

(*) Notice: Subject to any disclaimer, the term of this patent is extended or adjusted under 35 U.S.C. 154(b) by 0 days.

(21) Appl. No.: 15/675,370

(22) Filed: Aug. 11, 2017

(65) Prior Publication Data

US 2018/0043390 A1 Feb. 15, 2018

Related U.S. Application Data

(60) Provisional application No. 62/374,536, filed on Aug. 12, 2016.

(51) Int. Cl.
| | | |
|---|---|---|
| *B05C 17/01* | (2006.01) | |
| *A47K 5/12* | (2006.01) | |
| *B05B 11/00* | (2006.01) | |
| *G01F 11/02* | (2006.01) | |
| *G01F 13/00* | (2006.01) | |

(Continued)

(52) U.S. Cl.
CPC ............ *B05C 17/01* (2013.01); *A47K 5/1207* (2013.01); *B05B 11/3053* (2013.01); *B05B 11/3097* (2013.01); *G01F 11/022* (2013.01); *G01F 13/006* (2013.01); *B05B 11/00416* (2018.08); *B05C 5/0225* (2013.01);

(Continued)

(58) Field of Classification Search
CPC .... B05C 17/01; B05B 11/3097; A47K 5/1207
USPC ............................. 222/320, 321.6, 378, 566
See application file for complete search history.

(56) References Cited

U.S. PATENT DOCUMENTS

| 6,047,906 A | 4/2000 | Plager et al. |
| 7,870,978 B2 * | 1/2011 | Pardonge ............ B05B 11/3074 222/321.6 |

(Continued)

FOREIGN PATENT DOCUMENTS

| EP | 2371252 A2 | 10/2011 |
| EP | 2457664 A1 | 5/2012 |
| EP | 2641521 A2 | 9/2013 |

OTHER PUBLICATIONS

International Search Report and Written Opinion of counterpart International Application No. PCT/US2017/046587, dated Nov. 17, 2017, 16 pp.

(Continued)

*Primary Examiner* — Vishal Pancholi
(74) *Attorney, Agent, or Firm* — Shumaker & Sieffert, P.A.

(57) ABSTRACT

A retractable nozzle assembly is configured for dosing or dispensing highly viscous materials. The retractable nozzle assembly may be fitted to a delivery device containing a highly viscous chemical product to be dispensed. The retractable nozzle assembly may be actuated by hand, by mechanical action, or by any electromechanical device such as a dispenser. The retractable nozzle assembly includes a first path through a central bore in which the material moves at relatively slower flow rate and a secondary flow path in which the material moves at a relatively faster flow rate. The difference in flow rates at the outlet of the nozzle between the two flow paths helps to eliminate stringing and tailing of the high viscosity chemical product during dispensation.

21 Claims, 11 Drawing Sheets

(51) Int. Cl.
*B05C 11/10* (2006.01)
*B05C 5/02* (2006.01)

(52) U.S. Cl.
CPC ......... *B05C 11/1039* (2013.01); *B05C 17/014* (2013.01); *G01F 11/021* (2013.01)

(56) References Cited

U.S. PATENT DOCUMENTS

| | | | | |
|---|---|---|---|---|
| 7,954,674 | B2* | 6/2011 | Roy | B05B 11/3023 |
| | | | | 222/321.6 |
| 8,678,243 | B2* | 3/2014 | Collins | B05B 11/007 |
| | | | | 222/321.6 |
| 2009/0184137 | A1 | 7/2009 | O'Brien | |
| 2011/0240680 | A1* | 10/2011 | Ophardt | A47K 5/1207 |
| | | | | 222/321.8 |
| 2012/0132668 | A1* | 5/2012 | Ophardt | A47K 5/1207 |
| | | | | 222/1 |
| 2014/0091106 | A1* | 4/2014 | Ophardt | A47K 5/1207 |
| | | | | 222/181.3 |
| 2014/0205481 | A1* | 7/2014 | Ophardt | A47K 5/1207 |
| | | | | 417/466 |
| 2016/0355391 | A1 | 12/2016 | Torngren | |

OTHER PUBLICATIONS

International Preliminary Report on Patentability from counterpart International Application No. PCT/US2017/046587, dated Feb. 21, 2019, 11 pp.

* cited by examiner

RETRACTABLE NOZZLE FOR DOSING OR DISPENSING HIGH VISCOSITY MATERIALS

CROSS REFERENCE TO RELATED APPLICATIONS

This application claims the benefit of U.S. Provisional Application No. 62/374,536 filed Aug. 12, 2016, which is incorporated herein by reference in its entirety.

TECHNICAL FIELD

The disclosure relates to dispensation of chemical products.

BACKGROUND

Dispensing viscous materials and chemicals can be difficult due to their inherent properties. Usually high viscosity pumps require the use of high pressure to dose or dispense the product. These high pressures tend to make metered dose volume hard to predict. Another issue is that the materials generally have a very high surface tension, resulting in stringing or tailing from the outlet port or nozzle.

SUMMARY

In general, the disclosure relates to a retractable nozzle assembly configured for dosing or dispensing highly viscous materials. The retractable nozzle assembly may be fitted to a delivery device containing a highly viscous chemical product to be dispensed. The retractable nozzle assembly may be actuated by hand, by mechanical action, or by any electromechanical device such as a dispenser. In some examples, the retractable nozzle assembly may be incorporated into a chemical product dispenser, such as a manually actuated product dispenser or a touch free product dispenser.

In one example, the disclosure is directed to a retractable nozzle assembly comprising a nozzle feed tube having a proximal end and a distal end, and having a first longitudinally extending axial bore forming an inlet for a fluid to be dispensed at the proximal end and forming a feed tube outlet at the distal end, the nozzle feed tube further including one or more outlet ports positioned near the distal end of the nozzle feed tube, a seal plunger having a second longitudinally extending axial bore configured to slidably receive the nozzle feed tube, a nozzle tip configured to form a nozzle tip cavity and having a nozzle tip outlet, the nozzle tip connected at a distal end of the seal plunger such that the feed tube outlet is slidably movable within the nozzle tip cavity; and a spring mounted between the seal plunger and the nozzle feed tube biasing the seal plunger to a closed position with respect to the outlet ports in the nozzle feed tube, and wherein the seal plunger and the nozzle tip slidably move in a proximal direction along the nozzle feed tube and into an open position with respect to the outlet ports in the nozzle feed tube in response to application of an actuation force to the nozzle tip, the bore of the nozzle feed tube forming a first flow path for delivery of the fluid to be dispensed from the nozzle tip outlet, and the outlet ports forming an inlet to a secondary flow path through the nozzle tip cavity for delivery of the fluid to be dispensed from the nozzle tip outlet.

In another example, the disclosure is directed to a dispensing system comprising a delivery device, the delivery device comprising a container body having a reservoir containing a fluid product to be dispensed; and a valve member that when actuated dispenses the fluid product from the reservoir, and a nozzle assembly configured to connection to the delivery device, the nozzle assembly comprising a nozzle feed tube having a proximal end and a distal end, and having a first longitudinally extending axial bore forming an inlet for the fluid to be dispensed from the reservoir at the proximal end and forming a feed tube outlet at the distal end, the nozzle feed tube further including one or more outlet ports positioned near the distal end of the nozzle feed tube, wherein the proximal end of the nozzle feed tube is further configured to slidably move in a distal direction to actuate the valve when the seal plunger moves in the proximal direction in response to application of the actuation force, a seal plunger having a second longitudinally extending axial bore configured to slidably receive the nozzle feed tube, a nozzle tip configured to form a nozzle tip cavity and having a nozzle tip outlet, the nozzle tip connected at a distal end of the seal plunger such that the feed tube outlet is slidably movable within the nozzle tip cavity, and a spring mounted between the seal plunger and the nozzle feed tube biasing the seal plunger to a closed position with respect to the outlet ports in the nozzle feed tube, and wherein the seal plunger and the nozzle tip slidably move in a proximal direction along the nozzle feed tube and into an open position with respect to the outlet ports in the nozzle feed tube in response to application of an actuation force to the nozzle tip.

In another example, the disclosure is directed to a dispensing system, comprising a housing, a product reservoir containing a viscous fluid to be dispensed, a valve member that when actuated dispenses the fluid product from the reservoir, and a nozzle assembly, the nozzle assembly comprising a nozzle feed tube having a proximal end and a distal end, and having a first longitudinally extending axial bore forming an inlet for a fluid to be dispensed at the proximal end and forming a feed tube outlet at the distal end, the nozzle feed tube further including one or more outlet ports positioned near the distal end of the nozzle feed tube, a seal plunger having a second longitudinally extending axial bore configured to slidably receive the nozzle feed tube, a nozzle tip configured to form a nozzle tip cavity and having a nozzle tip outlet, the nozzle tip connected at a distal end of the seal plunger such that the feed tube outlet is slidably movable within the nozzle tip cavity, and a spring mounted between the seal plunger and the nozzle feed tube biasing the seal plunger to a closed position with respect to the outlet ports in the nozzle feed tube, and wherein the seal plunger and the nozzle tip slidably move in a proximal direction along the nozzle feed tube and into an open position with respect to the outlet ports in the nozzle feed tube in response to application of an actuation force to the nozzle tip, and a dispenser actuator configured to apply the actuation force to the nozzle tip.

The details of one or more examples are set forth in the accompanying drawings and the description below. Other features and advantages will be apparent from the description and drawings, and from the claims.

DETAILED DESCRIPTION

A retractable nozzle assembly is configured for dosing or dispensing highly viscous materials. The retractable nozzle assembly may be fitted to a delivery device containing a highly viscous chemical product to be dispensed. The retractable nozzle assembly may be actuated by hand, by mechanical action, or by any electromechanical device such as a dispenser. In some examples, the retractable nozzle assembly includes a first path through a central bore in which the material moves at relatively slower flow rate and a secondary flow path in which the material moves at a relatively faster flow rate. The difference in flow rates at the outlet of the nozzle between the two flow paths helps to eliminate stringing and tailing of the high viscosity chemical product during dispensation. In other examples, the central bore of the retractable nozzle assembly includes a sealed tip.

In some examples, the retractable nozzle assembly may be incorporated into a chemical product dispenser, such as a manually actuated hand hygiene product dispenser or a touch free hand hygiene product dispenser.

The retractable nozzle assembly uses the high viscosity of the chemical products dispensed to its advantage. When at rest, the flow path through the retractable nozzle assembly is sealed or restricted, making sure the viscous product does not drip or leak out of the tip. This holds true if the nozzle is held upright or is used inverted. When inverted the closed or restricted valve system ensures the viscous material stays in the nozzle, and will not leak out of the nozzle tip.

The retractable nozzle assemblies described herein may be used in conjunction with many configurations, including mechanical pumps, electronic pumps, airless cartridges, pressurized cartridges, air bladder cartridges etc. The retractable nozzle assembly is designed to dispense viscous materials without product tailing, stringing, or dripping.

In some examples, the retractable nozzle assemblies described herein may dispense products having a dynamic viscosity ranging from about 10,000 centipoise (e.g., hand cream) to about 100,000 centipoise (e.g., toothpaste). The dosage or dispense amount may depend on the viscosity of the chemical product to be dispensed. The retractable nozzle assemblies described herein may accurately dose high viscosity chemicals in increments of 0.3 ml.

The following table lists various example materials having a dynamic viscosity within this range.

| Dynamic Viscosity | Material |
| --- | --- |
| 10,000 | Hand Cream |
| 20-40,000 | Mayonnaise |
| 50,000 | Ketchup |
| 65,000 | Petroleum Jelly |
| 75,000 | Caulking Compound |
| 70-100,000 | Toothpaste |

Figure 1:
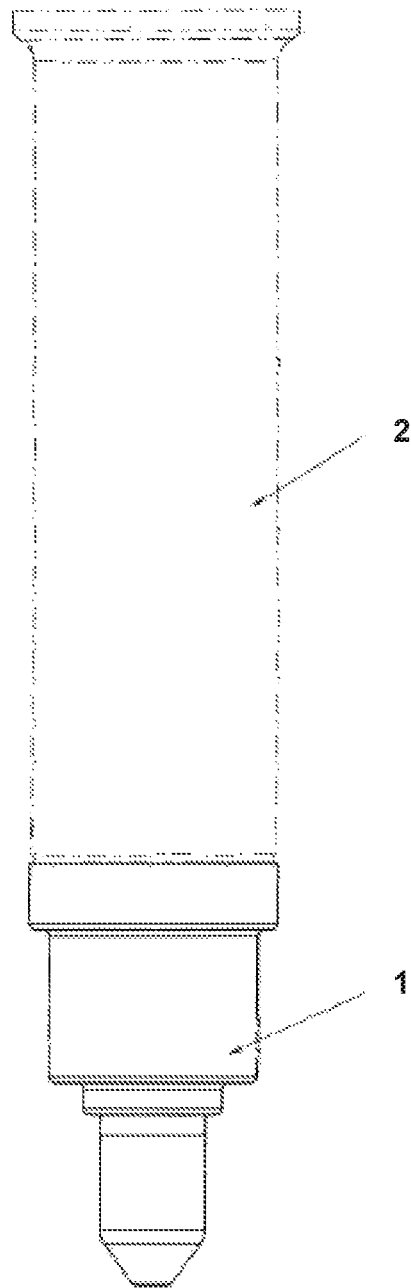
FIG. 1 shows a front view of an example retractable nozzle assembly according to the present disclosure fitted onto an example product delivery device containing a chemical product to be dispensed.

FIG. 1 shows a front view of an example retractable nozzle assembly 1 according to the present disclosure fitted onto an example delivery device 2 containing a chemical product to be dispensed.

Figure 2:
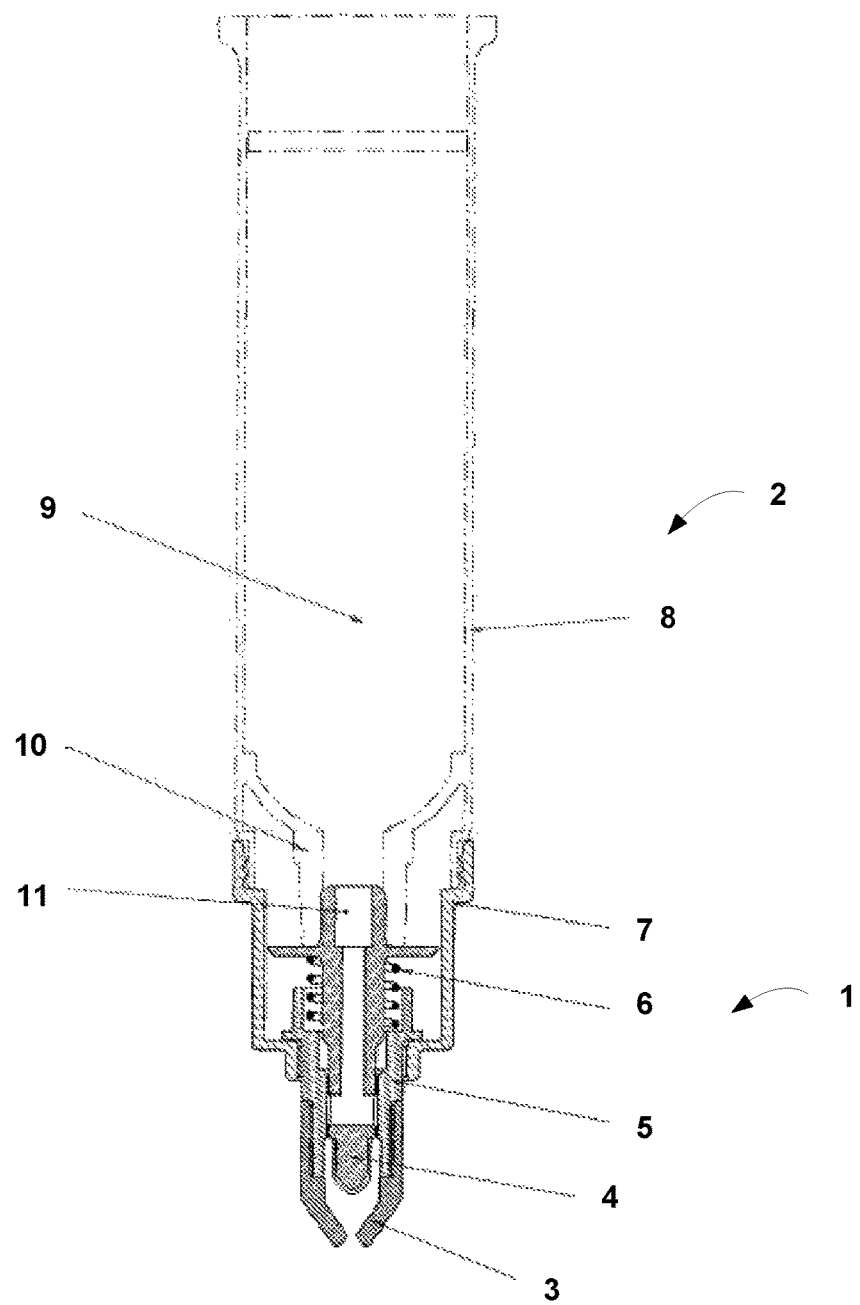
FIG. 2 shows a cross-sectional view of an example retractable nozzle assembly according to the present disclosure fitted onto an example product delivery device containing a chemical product to be dispensed.

FIG. 2 shows a cross-sectional view of an example retractable nozzle assembly 1 according to the present disclosure fitted onto an example product delivery device containing a chemical product to be dispensed. Retractable nozzle assembly 1 includes a nozzle tip 3, a nozzle feed tube 4, a seal plunger 5, a compression spring 6, and a retaining cap 7. The delivery device 2 includes a cartridge body 8 having an internal reservoir 9 that contains a chemical product to be dispensed and an actuator valve or pump mechanism 10. The retractable nozzle assembly 1 provides a flow path from the delivery device reservoir 9 through the actuator valve or pump mechanism 10 allowing the material or chemical to enter the nozzle through the base 11 of the nozzle feed tube 4.

For purposes of the present description, the term chemical product will be used to represent the high viscosity material being dispensed. However, it shall be understood that the retractable nozzle assemblies described herein may be used to dispense any type of high viscosity material, including chemical products, cleaning products, food products, industrial products, adhesives, building or construction materials, personal care products, hand hygiene products, pharmaceutical products, petroleum products, organic materials, and/or any other high viscosity material, and that the disclosure is not limited in this respect. The material to be dispensed may include any type of fluid, for example, gel, heavy lotion, heavy cream, ointment, paste, foams, grease, etc.

Figure 3:
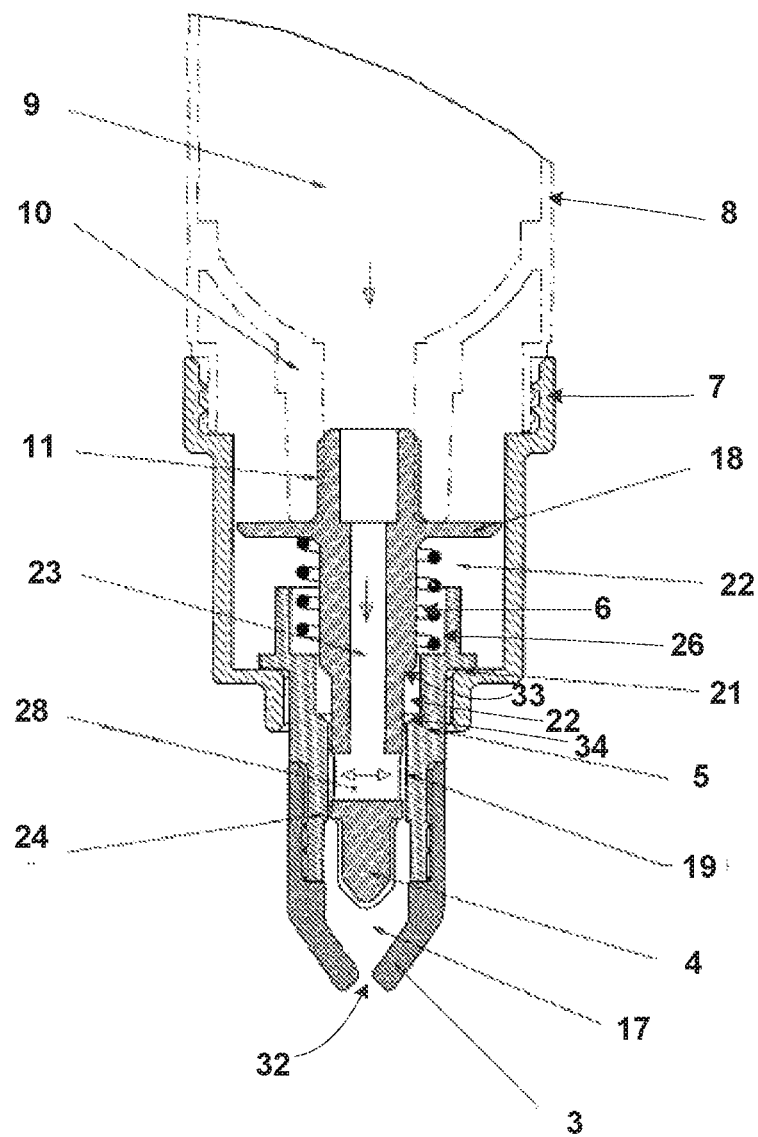
FIG. 3 shows a magnified cross-sectional view of the retractable nozzle assembly of FIG. 2 in a rest (non-actuated) position.

FIG. 3 shows a magnified cross-sectional view of the example retractable nozzle assembly 1 of FIG. 2 in a rest (non-actuated) position. Seal plunger 5 is slidably moveable along nozzle feed tube 4 and within retaining cap 7. Nozzle tip 3 is connected at a distal end of seal plunger 5. The connection may be made by, for example, a snap-fit, threaded connectors, or other connection mechanism. Seal plunger 5 and nozzle tip 3 move together axially along nozzle feed tube 4 when the retractable nozzle 1 is actuated. The travel of seal plunger 5 is regulated by a gap 22 between a shoulder 33 on the exterior sidewalls of nozzle feed tube 4 and a ledge 34 on the interior sidewalls of seal plunger 34.

Nozzle tip 3 includes a longitudinally extending axial bore sized to receive the distal end of nozzle feed tube 4. A distal end of nozzle tip 3 includes inwardly angled or canted sidewalls that form a narrowed nozzle tip outlet 32.

Seal plunger 5 includes a longitudinally extending axial bore sized to receive nozzle feed tube 4. A proximal end of seal plunger 5 forms a seat for compression spring 6. Nozzle feed tube 4 includes a longitudinally extending axial bore 23 which forms a flow path for dispensation of the chemical product from reservoir 9 through an outlet 32 formed by tip 3. Nozzle feed tube 4 further includes a transverse base portion 18 positioned near a proximal end 11 (the end nearest the cartridge body 8/pump 10) configured to cooperate with actuator valve or pump 10 to dispense chemical product from reservoir 9 when the retractable nozzle assembly 1 is actuated. The sidewalls of nozzle feed tube 4 further include one or more outlet ports (in this example, there are two outlet ports indicated by reference numerals 19 and 28 in the sidewalls of nozzle feed tube 4). Outlet ports 19/28 may include two opposing outlet ports, a radial pattern of circular outlet ports, one or more slots, or any other appropriate size or shape of outlet ports in the sidewalls of nozzle feed tube 4.

At rest, compression spring 6 provides a biasing spring force between the distal side of transverse base portion 18 and against the proximal end of seal plunger 5, such that seal plunger 5 is biased toward the distal end of nozzle feed tube 4. The flow path through bore 23 of nozzle feed tube and outlet ports 19 and 24 in nozzle feed tube 4 is therefore closed when the retractable nozzle assembly 1 is at rest. In other words, at rest when no force is applied to the actuator valve or pump 10, the flow path sealed at outlet ports 19 and 24, the system is closed and no chemical product is pushed into the nozzle feed tube 4.

Figure 4:
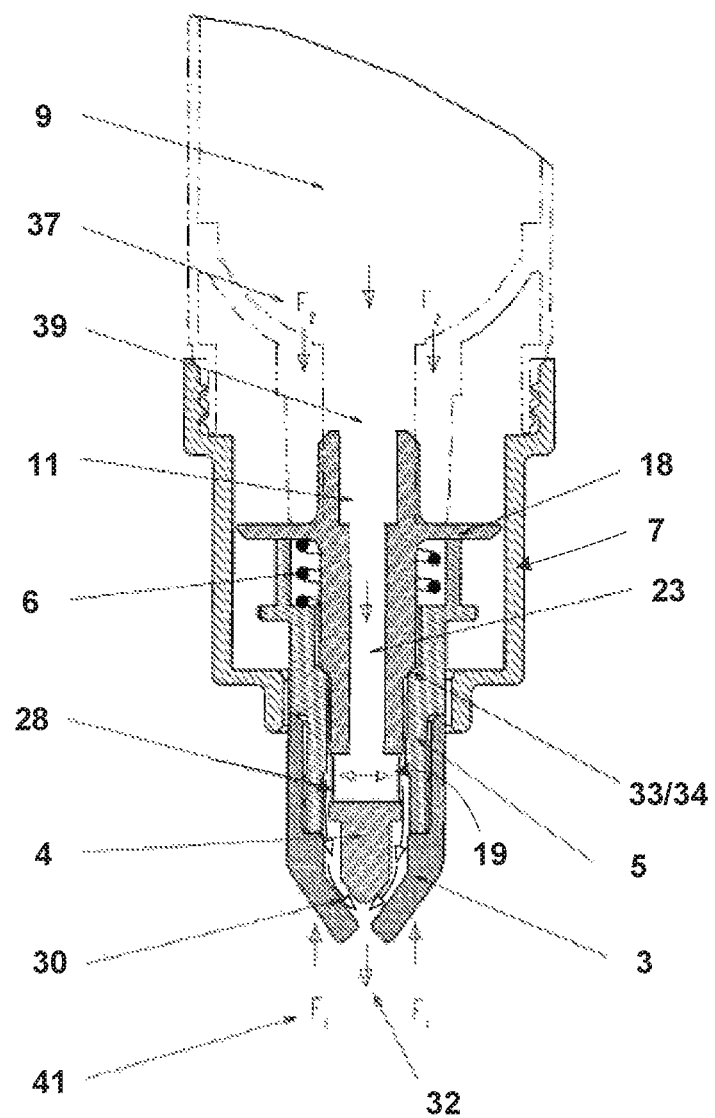
FIG. 4 shows a magnified cross-sectional view of the retractable nozzle assembly of FIG. 2 in an actuated position.

FIG. 4 shows a magnified cross-sectional view of the retractable nozzle assembly of FIG. 2 in an actuated position. The force $F_1$ represents the force required to compress the spring 6. The force $F_2$ represents the force required to open the actuator or pump 10 to push chemical product into the proximal end 11 of nozzle feed tube 4. In FIG. 4, the force $F_1$ is less than $F_2$, resulting in seal plunger 5 bottoming out against transverse base portion 18 of nozzle feed tube 4 and contact between shoulder 33 of nozzle feed tube 4 and ledge 34 of seal plunger 5 prior to overcoming the $F_2$ forces that allow the chemical product to enter the nozzle feed tube 4 under pressure.

Stage 1. Opening the Flow Path.

When retractable nozzle assembly 1 is actuated by exerting force $F_1$ at nozzle tip 3, nozzle tip 3 and seal plunger 5 move in a proximal direction and axially within cap 7 and along nozzle feed tube 4 toward the actuator assembly or pump 10. This movement results in four different actions in retractable nozzle assembly 1 that take place prior to the flow of chemical being released by actuator valve or pump 10. The first action is to open the flow path through the nozzle feed tube 4 by opening outlet ports 19/24 to allow chemical to travel through bore 23 of nozzle feed tube, through outlet ports 19/24 and out of opening 32 in the nozzle tip 3. The second action is restricting the flow path as indicated by reference numeral 30 as the distal end of the nozzle feed tube 4 approaches the interior canted surface of nozzle tip 3. The third action is forming a seal by contact of nozzle feed tube shoulder 33 and seal plunger ledge 34. The fourth action is bottoming out of seal plunger 5 on base 18 of nozzle feed tube 4. These actions prepare the retractable nozzle assembly 1 to receive chemical product from the reservoir 9 under pressure. As noted above, in FIG. 4, force $F_1$ has not exceeded $F_2$; therefore, the flow path has not been opened by the actuator valve or pump 10.

Stage 2. Opening the Flow Path into the Nozzle.

After the completion of Stage 1, an additional actuation force is applied to nozzle tip 3 such that $F_1$ exceeds $F_2$. When $F_2$ is exceeded, actuator valve or pump 10 is actuated, causing chemical product stored in reservoir 9 to enter nozzle feed tube 4 under pressure. The chemical product under pressure flows thru bore 23 in nozzle feed tube 4, through the open port(s) 19/24, through the flow path 30 and out of opening 32 in nozzle tip 3. The sealing action resulting from contact of nozzle feed tube shoulder 33 and seal plunger ledge 34 prevents the chemical product from leaking out of the system. The duration of time and/or length of stroke will determine the amount of chemical product to exit or be dispensed from the nozzle tip 3.

Stage 3. Stopping the Flow of Chemical Under Pressure from Entering the Nozzle Assembly As the applied actuation force $F_1$ is reduced, the $F_2$ force overcomes the $F_1$ force. At first, outlet ports 19/24 are still open; however, because $F_2$ is greater than $F_1$, actuator valve or pump 10 no longer forces chemical product into nozzle feed tube 4 under pressure. At this moment, $F_2$ has sealed or discontinued the flow of chemical product.

Stage 4. Nozzle Retraction

With the flow of pressurized chemical stopped, a certain amount of high viscosity material remains in the flow path. As the actuation force $F_1$ continues to reduce to zero, the spring force supplied by compression spring 6 pushes seal plunger 5 and nozzle tip 3 distally toward the distal end of nozzle feed tube 4. This action pushes the nozzle tip 3 and seal plunger 5 away from the distal end of nozzle feed tube 4 and closes the flow path through outlet ports 19/24. As nozzle feed tube 4 is thus pulled away (retracted) from interior canted surface of nozzle tip 3, it creates an air void 17 (see FIG. 3) or vacuum from the outside atmosphere to retract the viscous chemical product. This retraction creates a suck back feature that eliminates stringing, tailing and leaking of the high viscosity chemical from the retractable nozzle assembly 1.

Figure 5:
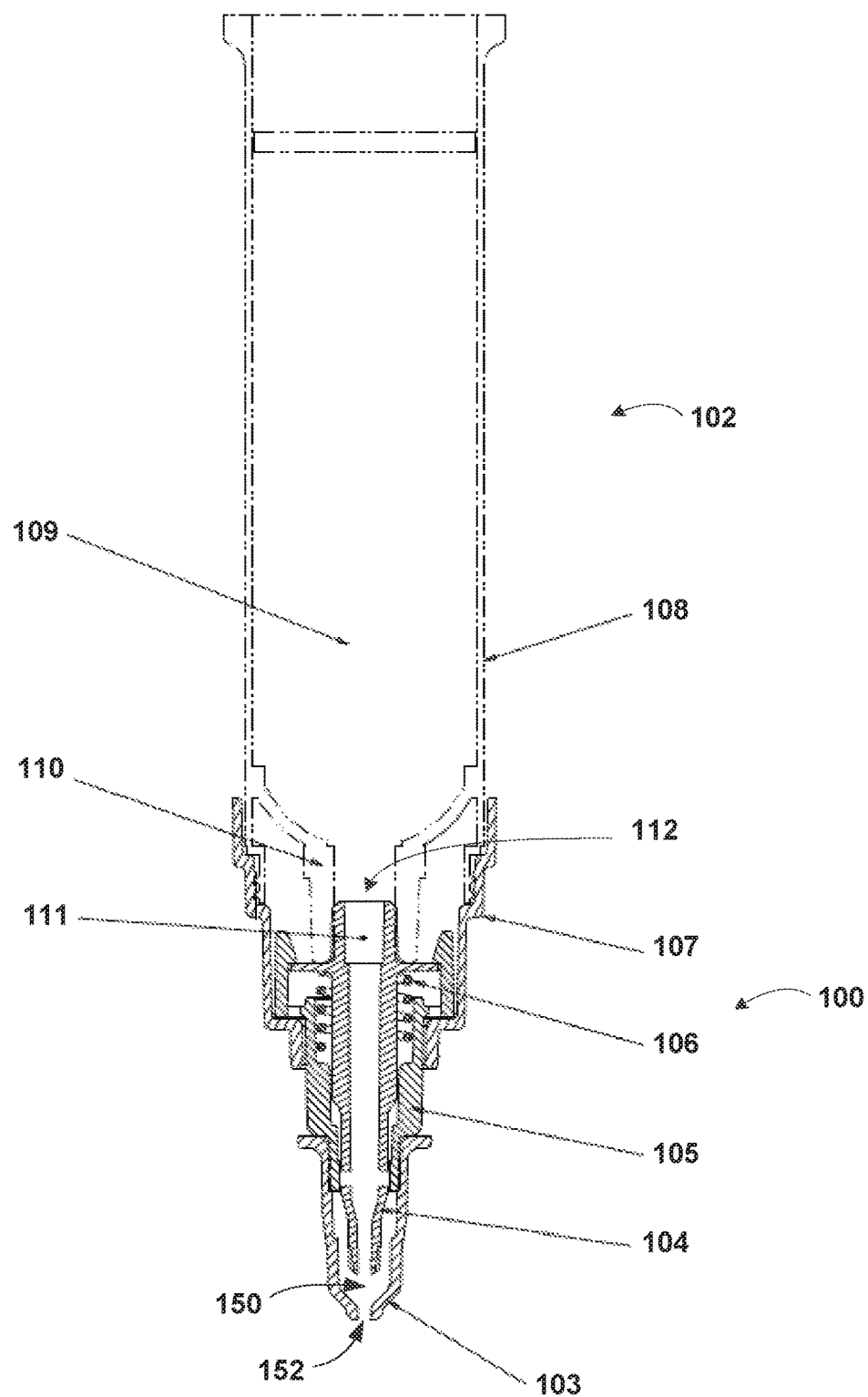
FIG. 5 shows a cross-sectional view of another example retractable nozzle assembly according to the present disclosure fitted onto an example product delivery device containing a chemical product to be dispensed.

FIG. 5 shows a magnified cross-sectional view of another example retractable nozzle assembly 100 according to the present disclosure fitted onto an example product delivery device 102 containing a chemical product to be dispensed.

Product delivery device 102 may include a cartridge, a pump, a bottle, a reservoir, or any other product container configured to receive or be fitted to retractable nozzle assembly 100. Retractable nozzle assembly 100 includes a nozzle tip 103, a nozzle feed tube 104, seal plunger 105, a spring 106, and a retaining cap 107. The nozzle assembly forms a flow path from the delivery device reservoir 109 through the actuator valve or pump 110, allowing the material or chemical product to enter nozzle assembly 100 through an inlet 112 at a proximal end 111 of nozzle feed tube 104.

As discussed above, for purposes of the present description, the term chemical product will be used to represent the high viscosity material being dispensed. However, it shall be understood that the retractable nozzle assembly may be used to dispense any type of high viscosity material, including chemical products, cleaning products, food products, industrial products, adhesives, building or construction materials, personal care products, hand hygiene products, pharmaceutical products, petroleum products, organic materials, and/or any other high viscosity material, and that the disclosure is not limited in this respect. The material to be dispensed may include any type of fluid, for example, gel, heavy lotion, heavy cream, ointment, paste, foams, grease, etc.

Figure 6:
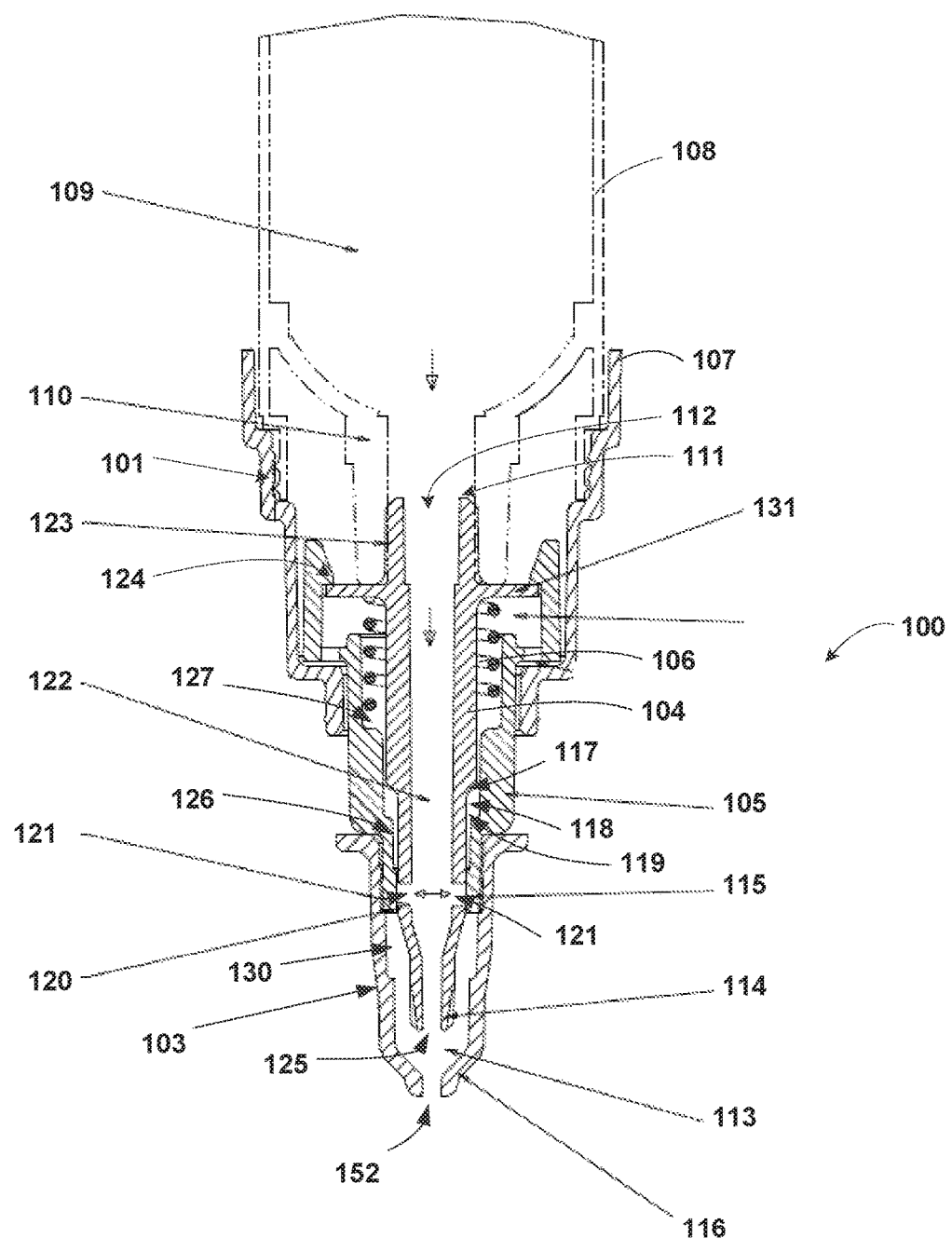
FIG. 6 shows a magnified cross-sectional view of the retractable nozzle assembly of FIG. 5 in a rest (non-actuated) position.

FIG. 6 shows a magnified cross-sectional view of retractable nozzle assembly 100 of FIG. 5 in a rest (non-actuated) position. A proximal end of nozzle tip 103 is fitted onto distal end 120 of seal plunger 105.

Nozzle feed tube 104 includes a longitudinally extending axial bore 122 forming an inlet 112 at proximal end 111 and an outlet 125 a distal end of nozzle feed tube 104. Nozzle feed tube 104 includes a transverse base portion 131 positioned near proximal end 111 of nozzle feed tube 104. Distal end 114 of nozzle feed tube 104 tapers to a reduced bore diameter such that the diameter of outlet 125 is smaller than the diameter of main portion of bore 122. The exterior sidewalls of nozzle feed tube 104 further include a circumferential shoulder 117 positioned distally with respect to transverse base portion 131 and one or more outlet ports 121 positioned distally with respect to shoulder 117. The sidewalls of nozzle feed tube 104 further include one or more outlet ports 121. Outlet ports 121 may include two opposing outlet ports, a radial pattern of circular outlet ports, one or more slots, or any other appropriate size, shape, or pattern of outlet ports in the sidewalls of nozzle feed tube 104.

Seal plunger 105 includes a longitudinally extending axial bore 126 sized to slidably receive nozzle feed tube 104. Seal plunger 105 is slidably moveable along nozzle feed tube 4 and within retaining cap 107. Nozzle tip 103 is connected at a distal end of seal plunger 105. Bore 126 at a proximal end of seal plunger 105 is further configured to receive the transverse base 131 and to slide within cap 107. Bore 126 of seal plunger is further configured to provide a seat 127 for compression spring 106. Proximal end of seal plunger 105 includes an interior stop 124 against which transverse base 131 is biased by spring 106 when the retractable nozzle assembly is at rest. The interior sidewalls of seal plunger 105 further include a circumferential ledge 119 configured to cooperate with shoulder 117 of nozzle feed tube 104. A gap 118 defined by shoulder 117 and ledge 119 defines the length of travel of the seal plunger 105 during actuation of retractable nozzle assembly 100. A distal end 120 of seal plunger 105 is configured for a snap fit (or other non-movable connection mechanism) with nozzle tip 103 such that these two components move together axially in a proximal direction with respect to nozzle feed tube 104 when retractable nozzle assembly 100 is actuated. Seal plunger 105 further includes interior sealing surfaces configured to seal outlet ports 121 of nozzle feed tube 104 when the seal plunger 105 is in a closed (rest) position with respect to nozzle feed tube 104.

Nozzle tip 103 includes a longitudinally extending axial bore sized to receive the distal end 114 of nozzle feed tube 114. A distal end of nozzle tip 103 includes inwardly angled sidewalls 116 that form a narrowed nozzle tip outlet 152.

In this example, retaining cap 107 includes interior snap-fit connectors that mate with corresponding snap-fit connectors on the exterior of delivery device dispensing cartridge 108. Retaining cap 107 and cartridge 108 may alternatively connect using mating threaded connectors or by any other type of mechanical fastener.

At rest, as shown in FIG. 6, transverse base portion 131 of nozzle feed tube 104 is in contact with, but does not apply any pressure to, cartridge actuator valve or pump 110. Sidewalls of nozzle feed tube 104 include one or more outlet ports 121. At rest, compression spring 106 exerts a spring force to bias seal plunger 105 in a closed position with respect to the one or more outlet ports 121 in nozzle feed tube 104 such that outlet ports 121 are closed by the distal end of seal plunger 105. A gap 118 regulates the amount of travel of seal plunger 105 with respect to the nozzle feed tube 104 when the retractable nozzle 100 is actuated (see FIG. 7, reference numerals 117/119).

Figure 8:
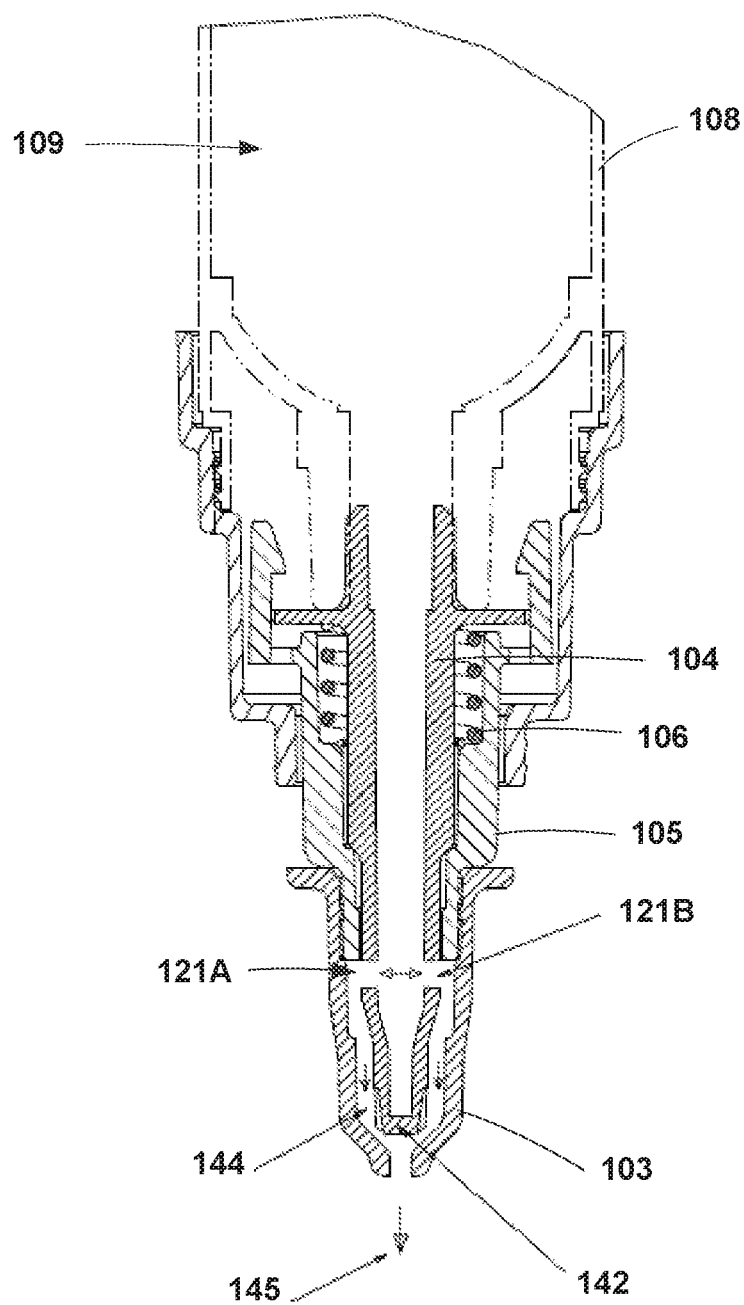
FIG. 8 shows a cross-sectional view the retractable nozzle assembly of FIG. 5 with an optional sealed nozzle feed tube tip.

In this example, distal end 114 of nozzle feed tube 104 has a relatively smaller flow path (i.e., narrower cross-sectional diameter) than the proximal end 111 of nozzle feed tube 104. The size of the flow path opening 125 at the distal end 114 of nozzle feed tube 104 can be increased, reduced or even eliminated (see, e.g., sealed tip 142 of nozzle feed tube 104 as shown in FIG. 8 for an example) based on the viscosity of the chemical product being dispensed and/or the desired dosage of the chemical product being dispensed. For example, for highly viscous (thick) chemical products, the first, in-line flow path 134 through bore 122 and outlet 125 of nozzle feed tube 104 is designed to increase the flow and reduce the force required to pump the chemical product from reservoir 109 through the retractable nozzle assembly 100.

As another example, for relatively less viscous chemical products, nozzle feed tube 104 may include a sealed tip 142, as shown in FIG. 8. Retractable nozzle assembly 100 with a sealed tip 142 is a sealed system at rest, even for relatively less viscous chemical products, because the flow path provided by outlet ports 121 is sealed by seal plunger 105 when the retractable nozzle 100 is at rest as shown in FIG. 6, (reference numeral 115). When at rest, the actuator valve or pump 110 is not under pressure, therefore no chemical is forced from the reservoir into the nozzle feed tube 104.

Figure 7:
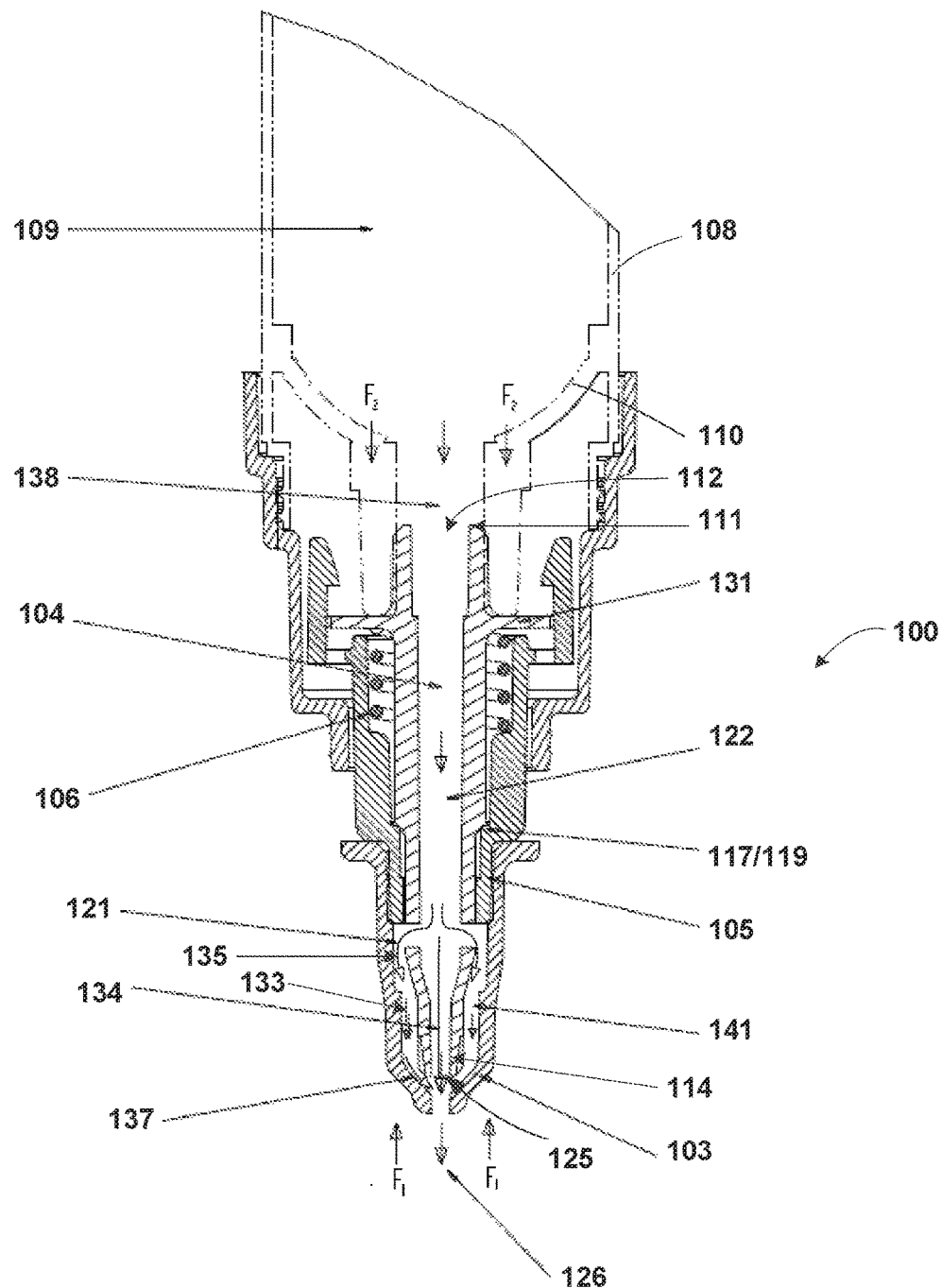
FIG. 7 shows a magnified cross-sectional view of the retractable nozzle assembly of FIG. 5 in an actuated position.

FIG. 7 shows a magnified cross-sectional view of retractable nozzle assembly 100 of FIG. 5 in an actuated position. The force $F_1$ represents the force required to compress spring 106. The force $F_2$ represents the force required to open the actuator or pump 110 to push chemical into the proximal end 111 of the nozzle feed tube 104. During a first portion of the actuation cycle, force $F_1$ is less than force $F_2$, resulting in seal plunger 105 bottoming out when ledge 119 meets shoulder 117 of nozzle feed tube 104 prior to overcoming the $F_2$ forces and allowing the chemical to enter the nozzle feed tube 104 under pressure.

Operation of retractable nozzle assembly 100 may be further described with respect to four stages of operation that occur during an actuation cycle.

Stage 1. Opening the Flow Path.

When the retractable nozzle 100 is actuated by exerting a force $F_1$ as shown in FIG. 7, nozzle tip 103 and seal plunger 105 move axially in a proximal direction (upwardly in the diagram of FIG. 7) with respect to nozzle feed tube 104. The amount of travel of seal plunger 105 is regulated by gap 118 between the opposing components (e.g., the seal plunger 105 and the nozzle feed tube 104) defined by shoulder 117 and ledge 119 as shown in FIG. 6.

Movement of seal plunger 5 with respect to nozzle feed tube 104 results in three different actions occurring within the retractable nozzle 100 prior to the flow of chemical product being forced from the cartridge reservoir 109 by actuator valve or pump 110. The first action is to open a flow path through retractable nozzle assembly 100 by moving seal plunger 105 to an open position with respect to outlet ports 121, thus forming a flow path for chemical product to travel through outlet ports 121, between the distal end of nozzle feed tube 104 and the inside of nozzle tip 103 as indicated by reference numeral 133, and finally to be dispensed from the outlet 152 of 126 of nozzle tip 103 as indicated by reference numeral 126.

The second action is to restrict the flow path as indicated by reference numeral 137 as the distal end 114 of the nozzle feed tube is moved relatively closer to an interior angled surface at the distal end of nozzle tip 103, such that the secondary flow path 137 has a relatively smaller cross-sectional area than first in-line flow path 134 through nozzle feed tube 104.

The third action is to form a seal by virtue of the contact between exterior shoulder 117 of nozzle feed tube 104 and interior ledge 119 of seal plunger 105. These actions prepare the nozzle assembly to receive chemical product from reservoir 109 under pressure. In Stage 1, force $F_1$ has not exceeded force $F_2$; therefore, no chemical product is yet flowing through the retractable nozzle assembly 100.

Stage 2. Pushing Chemical Product Through the Nozzle.

After the completion of Stage 1, additional actuation force is applied to the nozzle tip 103 such that $F_1$ exceeds $F_2$. When $F_2$ is exceeded, pump 110 forces the chemical product stored in reservoir 109 to enter proximal end 111 of nozzle feed tube 104 under pressure.

Retractable nozzle assembly 100 provides two flow paths for the chemical product; a first flow path and a secondary flow path. Central bore 122 through nozzle feed tube 104 and outlet 125 at the distal end 114 of nozzle feed tube 104 defines a first flow path 134 through nozzle assembly 100. In addition, with seal plunger 105 in the open position with respect to nozzle feed tube 104, the chemical product under pressure also flows through outlet ports 121 in the sidewalls of nozzle feed tube 104 as indicated by reference numeral 135. Outlet ports 121 thus define an inlet to a secondary flow path through nozzle assembly 100 as indicated by reference numerals 135, 133 and 137.

The chemical product flowing through secondary flow paths 133, 135, and 137 joins with first flow path 134, and is pushed out of the nozzle tip outlet 152 as indicated by reference numeral 126. The sealing action formed by contact of shoulder 117 and ledge 119 prevents the chemical product from leaking out of or being pushed back up into the system.

The duration of time and or length of the actuation stroke will determine the amount or dosage of chemical product to exit or be dispensed from nozzle tip 103. The narrowed tip outlet 125 at the distal end 114 of nozzle feed tube 104, when used with high viscosity chemicals, is designed to restrict the first flow path 134, so that the chemical product flows faster through the secondary flow path 135, 133, 137 than through the first flow path 134. When the relatively faster moving chemical product moving through secondary flow path 135, 133, 137 meets with the relatively slower moving chemical product exiting outlet 125 through first flow path 134, the action of the two different flow rates causes the high viscosity chemical to separate and fall from nozzle tip 103, eliminating stringing or tailing at the end of the actuation cycle.

Stage 3. Stopping the Flow of Chemical under Pressure from Entering the Retractable Nozzle Assembly.

Referring still to FIG. 7, as the applied actuation force $F_1$ is reduced, the $F_2$ force overcomes the $F_1$ force. At first, the flow path 135 is still open (that is, the seal plunger 105 is still in an open position with respect to outlet ports 121), but a force is no longer being applied to actuator valve or pump 110 so that chemical product is no longer being forced into nozzle feed tube 104 under pressure. At this moment, $F_2$ has stopped, and halts the flow of chemical product into the nozzle feed tube 104. At this time, bore 122 of nozzle feed tube 104 and nozzle flow cavity 150 are filled with chemical product that is not dispensed, but that remains trapped in the retractable nozzle assembly 100 as described below with respect to FIG. 9.

Stage 4. Nozzle Retraction.

Figure 9:
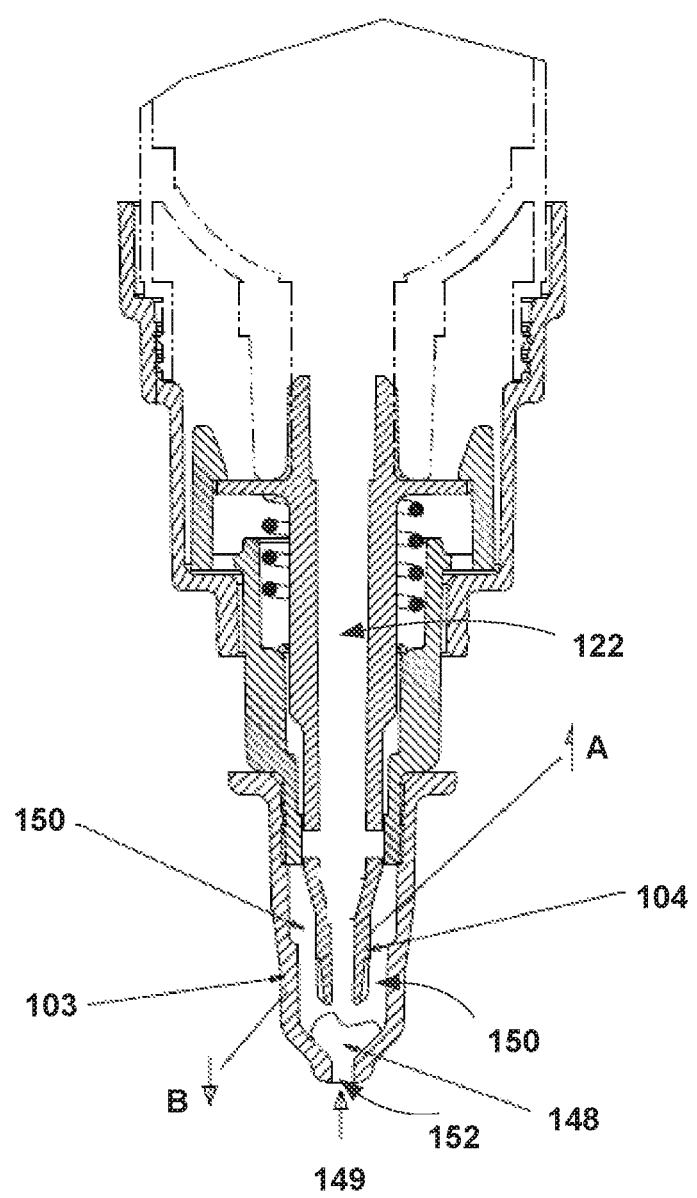
FIG. 9 shows a cross-sectional view of the retractable nozzle assembly of FIG. 5 after completion of an actuation in which the nozzle assembly is in a fully retracted position.

FIG. 9 shows a cross-sectional view of the retractable nozzle assembly of FIG. 5 after completion of an actuation cycle in which the nozzle assembly is in a fully retracted position. With the flow of pressurized chemical product stopped, there remains chemical product in bore 122 and nozzle tip cavity 150 (in other words, in the first and secondary flow paths) that was not dispensed from the nozzle tip 103. As the pump 110 returns to its resting position, the retractable nozzle assembly 100 also returns to is resting position as shown in FIG. 9. As the actuation force $F_1$ continues to reduce to zero, the spring force applied by compression spring 106 acts to slidably move seal plunger 105 distally with respect to nozzle feed tube 104. This action pulls distal end 114 of nozzle feed tube away from the nozzle tip 103, and moves seal plunger 105 into a closed position with respect to outlet ports 121, biasing seal plunger in the closed position and closing the secondary flow path defined by reference numerals 135, 133, 137.

During retraction, the nozzle feed tube 104 is pulled away in direction A (proximally) with respect to the nozzle tip 103. In addition, nozzle tip 103 moves in direction B (distally) with respect to the nozzle feed tube 104. Nozzle feed tube 104 acts as a piston pulling at least some of the chemical product in nozzle flow cavity 150 back away from nozzle tip 103, creating a void 148. As the pressure in void 148 drops from the internal suction created by the retraction of the nozzle feed tube 104, the outside atmosphere indicated by reference numeral 149 pushes air into nozzle tip 103 opening causing a retraction of the chemical product. This retraction creates a suck back feature. This suck back in conjunction with the two different flow speeds and two different flow paths helps to eliminate stringing and tailing of the high viscosity chemical during an actuation cycle. The combination of surface tension and high viscosity of the chemical product and the atmospheric pressure combine to ensure that the chemical product does not move or leak from outlet 152 when retractable nozzle assembly is in the closed position.

In some examples, the retractable nozzle assemblies described herein may dispense products having a dynamic viscosity ranging from about 10,000 centipoise (e.g., hand cream) to about 100,000 centipoise (e.g., toothpaste). The dosage or dispense amount may depend on the viscosity of the chemical product to be dispensed. The retractable nozzle assemblies described herein may accurately dose high viscosity chemicals in increments of 0.3 ml.

In addition, the specifications of the various components of the retractable nozzle assemblies may be adjusted depending upon the viscosity of the material to be dispensed and the desired dosage of the material to be dispensed. For example, the configuration and size of flow path diameters, the size of the bores through the nozzle feed tube and sealed tip nozzle feed tube, the size and shape of the outlet ports, the maximum length of stroke, the spring force, and any other specification of the retractable nozzle assemblies may be adjusted to achieve the target dosage of the desired chemical product. Thus, although specific designs and relative sizes and shapes are shown and described herein, it shall be understood that the disclosure is not limited to the specific specifications or relative sizes shown and described herein, and that the disclosure is not limited in this respect.

Explanation of One Example Chemical Delivery Device.

Figures 10A, 10B:
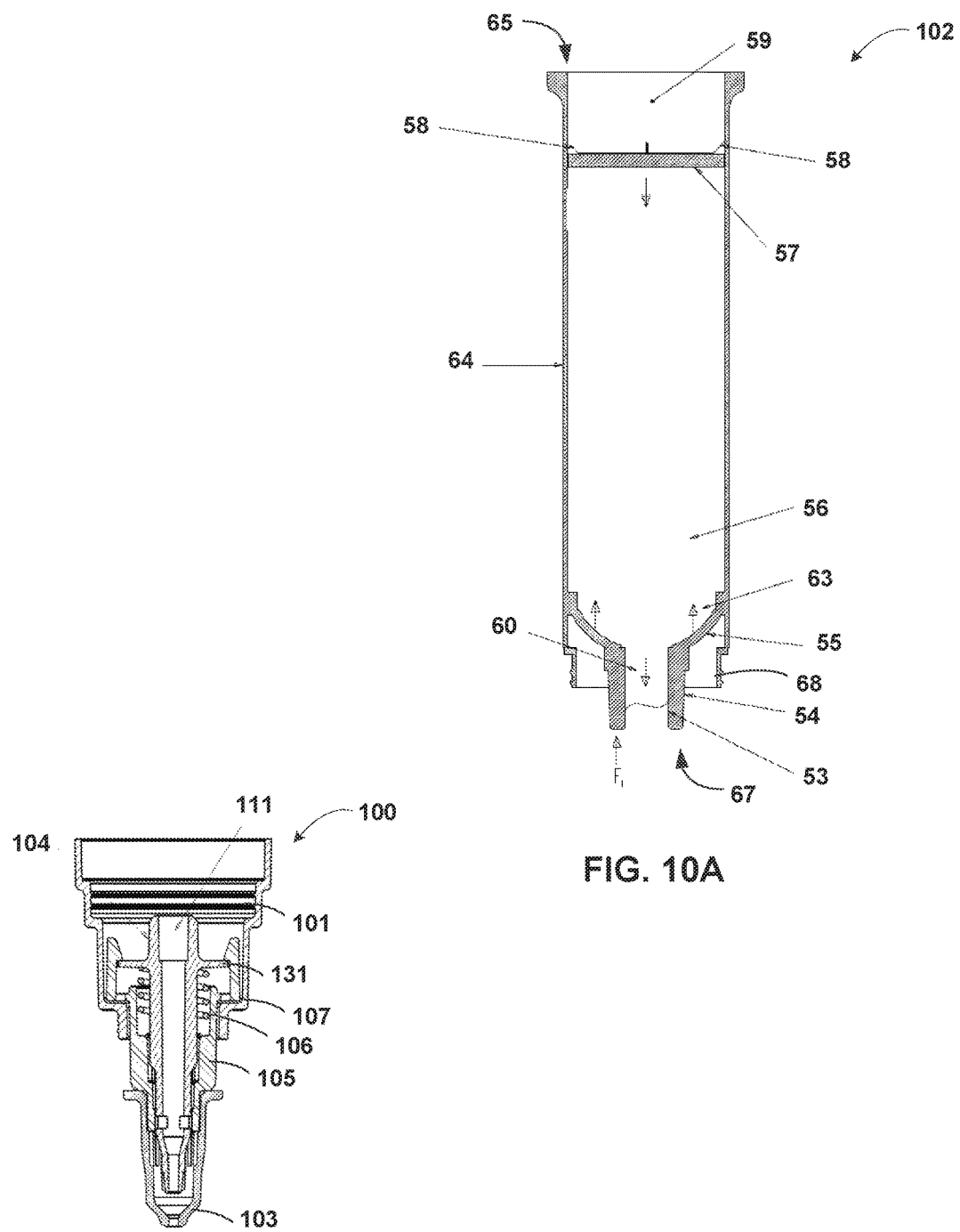
FIGS. 10A and 10B separately show cross-sectional views of the example retractable nozzle assembly of FIG. 5 and an example product delivery device, respectively.

FIGS. 10A and 10B separately show cross-sectional views of the example retractable nozzle assembly 100 of FIG. 5 and an example product delivery device 102, respectively. Although a specific example of delivery device 102 is shown and described herein, it shall be understood that the retractable nozzle assemblies described herein may be used in conjunction with many different types of delivery devices, and that the disclosure is not limited in this respect. The delivery device 102 is for purposes of description only and is not the only means to dispense chemical into a retractable nozzle assembly of the present disclosure.

The example delivery device 102 as shown in FIG. 10B includes a cartridge body 64 having a reservoir 56 that contains a chemical product to be dispensed, a diaphragm plunger 55 having a diaphragm piston 54, a plunger 57, and a directional plunger clip 58.

As described above with respect to FIG. 5, retractable nozzle assembly 100 includes nozzle tip 103, nozzle feed tube 104, seal plunger 105, cap 107, and compression spring 106. In this example, retaining cap 107 includes interior snap-fit connectors 101 that mate with corresponding snap-fit connectors 68 at or near the distal end 67 or cartridge body 64 for fitting retractable nozzle assembly 100 to delivery device 102. Retaining cap 107 and cartridge 108 may alternatively connect using mating threaded connectors or by any other type of mechanical fastener.

When a retractable nozzle assembly, such as example retractable nozzle assembly 100 as shown in FIG. 10A, is fitted to the delivery device 102 (see, e.g., FIG. 5), nozzle feed tube 104 interfaces with the mating silicone diaphragm piston 54. This creates a flow path from the reservoir 56 through an outlet port 60 formed by a piston 54 of convex (with respect to the distal end 67 of cartridge body 64) diaphragm plunger 55 and into proximal end 111 of nozzle feed tube 104.

Reservoir 56 may be filled via a fill port 59 located at a proximal end 65 of cartridge body 64. The chemical product is filled such that there is no air in the cartridge. Plunger 57 is inserted into the filled cartridge body and contains an air bleeder vent (not shown) to make sure that no air is forced into the filled chemical. After plunger 57 is inserted completely to the chemical level, directional plunger clip 58 is installed to the plunger. Directional plunger clip 58 has a plug that snaps into plunger 57 closing off the air vent required to install the plunger without introducing air. Directional plunger clip only allows the plunger 57 to move towards the outlet 60. Plunger 57 and directional plunger clip act as a chemical squeegee, scraping the interior sidewalls of cartridge body 64, moving and pushing the chemical product toward outlet 60 as chemical exits the system.

When retractable nozzle assembly 100 is fitted to the cartridge body 64 and the assembly 100 is actuated, transverse base 131 located at or near the proximal end 111 of nozzle feed tube 104 transfers the applied force $F_1$ to diaphragm piston 54. The resulting compression of flexible convex silicone diaphragm 55 membrane reduces the volume inside the cartridge reservoir by compressing the chemical as indicated by reference numeral 63. Directional plunger clip 58 counter acts this force and holds the plunger 57 in its current position, forcing chemical product to exit the diaphragm outlet 60, and thus forcing pressurized chemical product into retractable nozzle assembly 100 at the proximal end 111 of nozzle feed tube. After the chemical product is dispensed and the actuation force $F_1$ is eliminated, diaphragm plunger 55 now works as a return mechanism to reset the system back to equilibrium. Upon returning to the resting position (see, e.g., FIG. 9), diaphragm plunger 55 creates a negative pressure inside the reservoir 56 of cartridge body 64. This internal pressure drop forces the outside atmospheric pressure to try to equalize, forcing plunger 57 in the direction of the outlet 60. Directional plunger clip 58 will allow plunger 57 to move towards the chemical (e.g., toward the distal end 67 of cartridge body 64) but not backwards out of the proximal end 65 cartridge body 64. As the chemical product is dispensed, plunger 57 and directional plunger clip 58 move together to continuously push chemical product toward outlet 60. The plunger assembly works as an elevator and piston to fully evacuate the chemical one dispense cycle at a time.

As discussed above, there are many different delivery devices that can be used with the retractable nozzle assemblies of the type described herein, and it shall be understood that the examples described herein are given for purposes of illustration only, and that the disclosure is not limited in this respect. For example, the reservoir and pump may include almost any delivery device that is driven by an airless design, may include a pressure driven system like aerosol, or a spring driven piston, among others.

Figure 11:
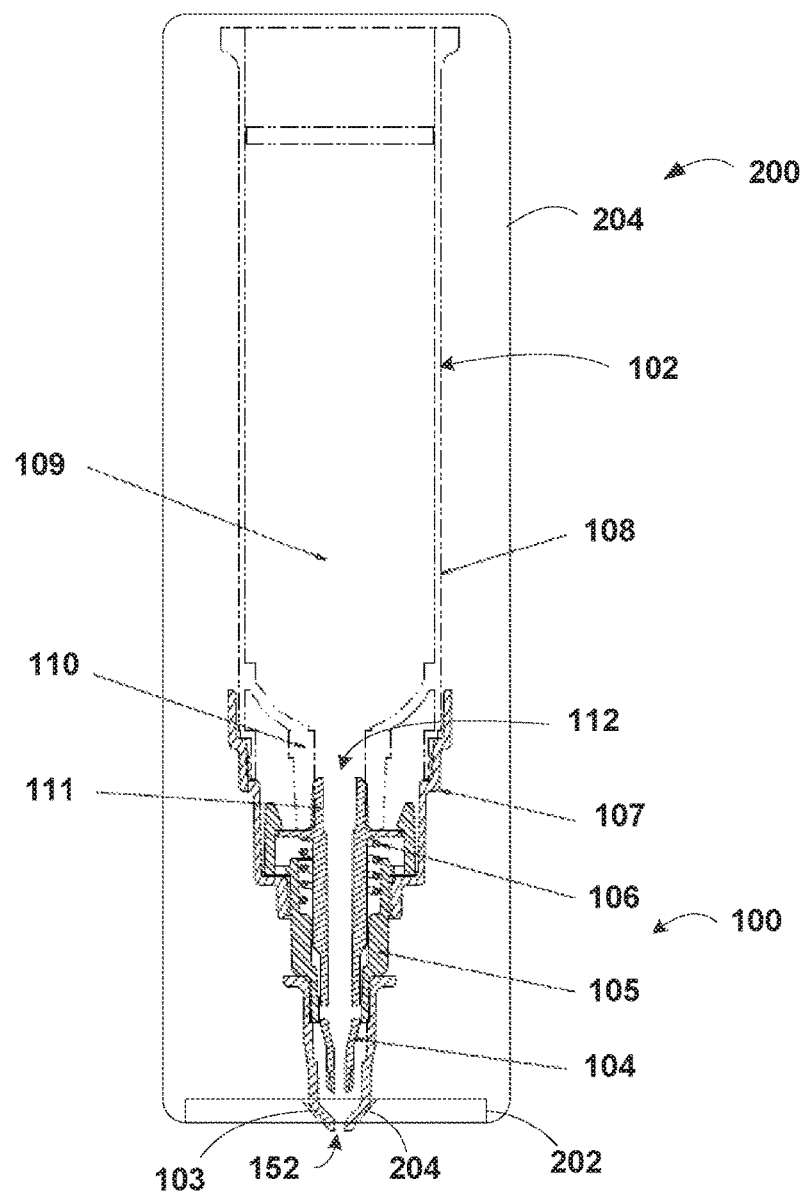
FIG. 11 shows a cross-sectional view of the retractable nozzle assembly of FIG. 5 mounted into a touch free dispensing device.

FIG. 11 shows a cross-sectional view of an example dispensing system 200 incorporating the retractable nozzle assembly 100. Dispensing system 200 includes a housing 204, a container body 108 internally received into the housing, the container body having a product reservoir 109 containing a viscous fluid to be dispensed, a valve member 110 that when actuated dispenses the fluid product from reservoir 109, and a nozzle assembly 100, such as retractable nozzle assemblies shown in any one of FIGS. 5-10. It shall be understood that retractable nozzle assembly 1 of FIGS. 2-4 may also be incorporated into dispensing system 200. Dispensing system 200 further includes a dispenser actuator 202 configured to apply an actuation force to nozzle tip 103.

In this example dispenser actuator 202 is a pump block 202 having an actuation surface 204 configured to receive retractable nozzle assembly 100 such that pump block 202 applies an actuation force to nozzle tip 103 when the dispensing system 200 is actuated. Dispensing system 200 may include, for example, a hand hygiene product dispenser, personal care product dispenser, detergent or cleaning product dispenser, food product dispenser, etc. Dispenser 200 may be a free-standing dispenser, a wall-mounted dispenser, a counter-mounted dispenser, or may be configured to be mounted to any desired substrate. The time and length of actuation stroke that the dispensing system 200 applies to retractable nozzle assembly 100 may be tuned to dispense a set amount or predetermined dosage of chemical product per actuation cycle.

Dispensing system 200 may be a manual dispenser, in which case manual actuator 202 includes an actuator button, push bar, lever, knob, etc. that is manually actuated. Manual actuation causes dispenser actuator block 202 to move toward the proximal end 111 of retractable nozzle assembly 100, thus applying an actuation force to nozzle tip 103 of retractable nozzle assembly. Application of the force of nozzle tip 103 actuates retractable nozzle assembly 100 to dispense a premeasured amount of the chemical product from reservoir 109 and out of nozzle outlet 152 as described above.

In another example, dispensing device 200 may be an automatic or touch-free dispensing device which is actuated upon sensing presence of a user's hands or other object onto or into which to dispense the chemical product. In that case, dispenser actuator 202 may include a sensor that senses presence of a user's hands or other object near the dispenser outlet 152. Dispenser actuator may further include a motorized actuator that is activated by sensor in response to detection of presence of, for example, a user's hands near the dispenser outlet. Upon being activated by the sensor, the motorized actuator applies an actuation force to nozzle tip 103. Application of the force of nozzle tip 103 actuates retractable nozzle assembly 100 to dispense a premeasured amount of the chemical product from reservoir 109 and out of nozzle outlet 152 as described above.

EXAMPLE 1

A retractable nozzle assembly, comprising a nozzle feed tube having a proximal end and a distal end, and having a first longitudinally extending axial bore forming an inlet for a fluid to be dispensed at the proximal end and forming a feed tube outlet at the distal end, the nozzle feed tube further including one or more outlet ports positioned near the distal end of the nozzle feed tube, a seal plunger having a second longitudinally extending axial bore configured to slidably receive the nozzle feed tube, a nozzle tip configured to form a nozzle tip cavity and having a nozzle tip outlet, the nozzle tip connected at a distal end of the seal plunger such that the feed tube outlet is slidably movable within the nozzle tip cavity; and a spring mounted between the seal plunger and the nozzle feed tube biasing the seal plunger to a closed position with respect to the outlet ports in the nozzle feed tube, and wherein the seal plunger and the nozzle tip slidably move in a proximal direction along the nozzle feed tube and into an open position with respect to the outlet ports in the nozzle feed tube in response to application of an actuation force to the nozzle tip, the bore of the nozzle feed tube forming a first flow path for delivery of the fluid to be dispensed from the nozzle tip outlet, and the outlet ports forming an inlet to a secondary flow path through the nozzle tip cavity for delivery of the fluid to be dispensed from the nozzle tip outlet.

EXAMPLE 2

The retractable nozzle assembly of Example 1, wherein the proximal end of the nozzle feed tube is further configured to slidably move in a distal direction to actuate a delivery device containing the fluid to be dispensed when the seal plunger moves in the proximal direction in response to application of the actuation force.

EXAMPLE 3

The retractable nozzle assembly of Example 1, wherein the nozzle feed tube further includes an exterior shoulder positioned distally with respect to the inlet, and the seal plunger further includes an interior ledge positioned distally with respect to the exterior shoulder of the nozzle feed tube, the interior ledge configured to contact the exterior shoulder of the nozzle feed tube when the actuation force is applied to the nozzle tip to prevent further slidable movement of the seal plunger in the proximal direction with the respect to the nozzle feed tube.

EXAMPLE 4

The retractable nozzle assembly of Example 1 wherein the nozzle feed tube further comprises a transverse base portion positioned near the proximal end configured to actuate a delivery device containing the fluid to be dispensed.

EXAMPLE 5

The retractable nozzle assembly of Example 1 wherein the distal end of the nozzle feed tube tapers to a reduced bore diameter such that a diameter of the feed tube outlet is smaller than a diameter of the bore.

EXAMPLE 6

The retractable nozzle assembly of Example 1 wherein the fluid to be dispensed has a dynamic viscosity ranging from 10,000 centipoise to 100,000 centipoise.

EXAMPLE 7

The retractable nozzle assembly of Example 1 wherein the seal plunger is further configured to form a seat for the spring.

EXAMPLE 8

The retractable nozzle assembly of Example 7 wherein the nozzle feed tube further comprises a transverse base portion positioned near the proximal end of the nozzle feed tube, and wherein the proximal end of the seal plunger includes an interior stop against which the transverse base is biased by the spring when the retractable nozzle assembly is in the closed position.

EXAMPLE 9

The retractable nozzle assembly of Example 7 wherein the nozzle feed tube further comprises a transverse base portion positioned near the proximal end of the nozzle feed tube, and wherein the proximal end of the seal plunger includes an interior stop against which the transverse base is biased by the spring when the retractable nozzle assembly is in the closed position, and wherein the spring is further compressed between the seat and the transverse base portion in response to application of the actuation force.

EXAMPLE 10

The retractable nozzle assembly of Example 1, further including a cap configured to be connected to a delivery device containing the fluid to be dispensed.

EXAMPLE 11

The retractable nozzle assembly of Example 1 wherein the fluid is a chemical product.

EXAMPLE 12

The retractable nozzle assembly of Example 1 wherein the fluid is one of a hand hygiene product, or a personal care product.

EXAMPLE 13

The retractable nozzle assembly of Example 1 wherein the fluid is one of a gel, a lotion, a cream, an ointment, a paste, and a foam.

EXAMPLE 14

A dispensing system, comprising a delivery device, the delivery device comprising a container body having a reservoir containing a fluid product to be dispensed; and a valve member that when actuated dispenses the fluid product from the reservoir, and a nozzle assembly configured to connection to the delivery device, the nozzle assembly comprising a nozzle feed tube having a proximal end and a distal end, and having a first longitudinally extending axial bore forming an inlet for the fluid to be dispensed from the reservoir at the proximal end and forming a feed tube outlet at the distal end, the nozzle feed tube further including one or more outlet ports positioned near the distal end of the nozzle feed tube, wherein the proximal end of the nozzle feed tube is further configured to slidably move in a distal direction to actuate the valve when the seal plunger moves in the proximal direction in response to application of the actuation force, a seal plunger having a second longitudinally extending axial bore configured to slidably receive the nozzle feed tube, a nozzle tip configured to form a nozzle tip cavity and having a nozzle tip outlet, the nozzle tip connected at a distal end of the seal plunger such that the feed tube outlet is slidably movable within the nozzle tip cavity, and a spring mounted between the seal plunger and the nozzle feed tube biasing the seal plunger to a closed position with respect to the outlet ports in the nozzle feed tube, and wherein the seal plunger and the nozzle tip slidably move in a proximal direction along the nozzle feed tube and into an open position with respect to the outlet ports in the nozzle feed tube in response to application of an actuation force to the nozzle tip.

EXAMPLE 15

The dispensing system of Example 14, wherein the bore of the nozzle feed tube forms a first flow path for delivery of the fluid to be dispensed from the nozzle tip outlet, and the outlet ports form an inlet to a secondary flow path through the nozzle tip cavity for delivery of the fluid to be dispensed from the nozzle tip outlet.

EXAMPLE 16

The dispensing system of Example 14, wherein the nozzle feed tube further comprises a transverse base portion positioned near the proximal end configured to actuate the valve and dispense the fluid from the reservoir into the inlet of the nozzle feed tube.

EXAMPLE 17

The dispensing system of Example 14 wherein the distal end of the nozzle feed tube tapers to a reduced bore diameter such that a diameter of the feed tube outlet is smaller than a diameter of the bore.

EXAMPLE 18

The dispensing system of Example 14 wherein the fluid to be dispensed has a dynamic viscosity ranging from 10,000 centipoise to 100,000 centipoise.

EXAMPLE 19

A dispensing system, comprising a housing, a product reservoir containing a viscous fluid to be dispensed, a valve member that when actuated dispenses the fluid product from the reservoir, and a nozzle assembly, the nozzle assembly comprising a nozzle feed tube having a proximal end and a distal end, and having a first longitudinally extending axial bore forming an inlet for a fluid to be dispensed at the proximal end and forming a feed tube outlet at the distal end, the nozzle feed tube further including one or more outlet ports positioned near the distal end of the nozzle feed tube, a seal plunger having a second longitudinally extending axial bore configured to slidably receive the nozzle feed tube, a nozzle tip configured to form a nozzle tip cavity and having a nozzle tip outlet, the nozzle tip connected at a distal end of the seal plunger such that the feed tube outlet is slidably movable within the nozzle tip cavity, and a spring mounted between the seal plunger and the nozzle feed tube biasing the seal plunger to a closed position with respect to the outlet ports in the nozzle feed tube, and wherein the seal plunger and the nozzle tip slidably move in a proximal direction along the nozzle feed tube and into an open position with respect to the outlet ports in the nozzle feed tube in response to application of an actuation force to the nozzle tip, and a dispenser actuator configured to apply the actuation force to the nozzle tip.

EXAMPLE 20

The dispensing system of Example 19, wherein the dispenser actuator is a manual dispenser actuator or a touch-free dispenser actuator.

Various examples have been described. These and other examples are within the scope of the following claims.

The invention claimed is:

1. A retractable nozzle assembly, comprising:
    a nozzle feed tube having a proximal end and a distal end, and having a first longitudinally extending axial bore forming an inlet for a fluid to be dispensed at the proximal end and forming a feed tube outlet at the distal end, and having one or more outlet ports disposed in sidewalls of the nozzle feed tube near the distal end of the nozzle feed tube;
    a seal plunger having a second longitudinally extending axial bore configured to slidably receive the nozzle feed tube;
    a nozzle tip configured to form a nozzle tip cavity and having a nozzle tip outlet, the nozzle tip connected at a distal end of the seal plunger such that the feed tube outlet is slidably movable within the nozzle tip cavity; and
    a spring mounted between the seal plunger and the nozzle feed tube biasing the seal plunger to a closed position with respect to the outlet ports in the nozzle feed tube; and
    wherein the seal plunger and the nozzle tip slidably move in a proximal direction along the nozzle feed tube and into an open position with respect to the outlet ports in the nozzle feed tube in response to application of an actuation force to the nozzle tip,
    the bore of the nozzle feed tube forming a first flow path through which the fluid flows from the proximal end of the nozzle feed tube toward the distal end of the nozzle feed tube to be dispensed from the nozzle tip outlet, and
    the outlet ports forming an inlet to a secondary flow path through which the fluid flows from the outlet ports through the nozzle tip cavity at a faster flow rate than a flow rate of the fluid through the first flow path to be dispensed from the nozzle tip outlet.

2. The retractable nozzle assembly of claim 1, wherein the proximal end of the nozzle feed tube is further configured to slidably move in a distal direction to actuate a delivery device containing the fluid to be dispensed when the seal plunger moves in the proximal direction in response to application of the actuation force.

3. The retractable nozzle assembly of claim 1, wherein the nozzle feed tube further includes an exterior shoulder positioned distally with respect to the inlet; and
    the seal plunger further includes an interior ledge positioned distally with respect to the exterior shoulder of the nozzle feed tube, the interior ledge configured to contact the exterior shoulder of the nozzle feed tube when the actuation force is applied to the nozzle tip to prevent further slidable movement of the seal plunger in the proximal direction with the respect to the nozzle feed tube.

4. The retractable nozzle assembly of claim 1 wherein the nozzle feed tube further comprises a transverse base portion positioned near the proximal end configured to actuate a delivery device containing the fluid to be dispensed.

5. The retractable nozzle assembly of claim 1 wherein the distal end of the nozzle feed tube tapers to a reduced bore diameter such that a diameter of the feed tube outlet is smaller than a diameter of the bore.

6. The retractable nozzle assembly of claim 1 wherein the fluid to be dispensed has a dynamic viscosity ranging from 10,000 centipoise to 100,000 centipoise.

7. The retractable nozzle assembly of claim 1 wherein the seal plunger is further configured to form a seat for the spring.

8. The retractable nozzle assembly of claim 7 wherein the nozzle feed tube further comprises a transverse base portion positioned near the proximal end of the nozzle feed tube, and wherein the proximal end of the seal plunger includes an interior stop against which the transverse base is biased by the spring when the retractable nozzle assembly is in the closed position.

9. The retractable nozzle assembly of claim 7 wherein the nozzle feed tube further comprises a transverse base portion positioned near the proximal end of the nozzle feed tube, and wherein the proximal end of the seal plunger includes an interior stop against which the transverse base is biased by the spring when the retractable nozzle assembly is in the closed position, and wherein the spring is further compressed between the seat and the transverse base portion in response to application of the actuation force.

10. The retractable nozzle assembly of claim 1, further including a cap configured to be connected to a delivery device containing the fluid to be dispensed.

11. The retractable nozzle assembly of claim 1 wherein the fluid is a chemical product.

12. The retractable nozzle assembly of claim 1 wherein the fluid is one of a hand hygiene product or a personal care product.

13. The retractable nozzle assembly of claim 1 wherein the fluid is one of a gel, a lotion, a cream, an ointment, a paste, and a foam.

14. A dispensing system, comprising:
a delivery device, the delivery device comprising:
a container body having a reservoir containing a fluid product to be dispensed; and
a valve member that when actuated dispenses the fluid product from the reservoir; and
a nozzle assembly configured to connection to the delivery device, the nozzle assembly comprising:
a nozzle feed tube having a proximal end and a distal end, and having a first longitudinally extending axial bore forming an inlet for the fluid to be dispensed from the reservoir at the proximal end and forming a feed tube outlet at the distal end, the nozzle feed tube further including one or more outlet ports positioned near the distal end of the nozzle feed tube, wherein the proximal end of the nozzle feed tube is further configured to slidably move in a distal direction to actuate the valve when the seal plunger moves in the proximal direction in response to application of the actuation force;
a seal plunger having a second longitudinally extending axial bore configured to slidably receive the nozzle feed tube;
a nozzle tip configured to form a nozzle tip cavity and having a nozzle tip outlet, the nozzle tip connected at a distal end of the seal plunger such that the feed tube outlet is slidably movable within the nozzle tip cavity; and
a spring mounted between the seal plunger and the nozzle feed tube biasing the seal plunger to a closed position with respect to the outlet ports in the nozzle feed tube;
wherein the seal plunger and the nozzle tip slidably move in a proximal direction along the nozzle feed tube and into an open position with respect to the outlet ports in the nozzle feed tube in response to application of an actuation force to the nozzle tip; and
wherein the bore of the nozzle feed tube forms a first flow path through which the fluid flows from the proximal end of the nozzle feed tube toward the distal end of the nozzle feed tube to be dispensed from the nozzle tip outlet, and the outlet ports form an inlet to a secondary flow path through which the fluid flows from the outlet ports through the nozzle tip cavity at a faster flow rate than a flow rate of the fluid through the first flow path to be dispensed from the nozzle tip outlet.

15. The dispensing system of claim 14, wherein the nozzle feed tube further comprises a transverse base portion positioned near the proximal end configured to actuate the valve and dispense the fluid from the reservoir into the inlet of the nozzle feed tube.

16. The dispensing system of claim 14 wherein the distal end of the nozzle feed tube tapers to a reduced bore diameter such that a diameter of the feed tube outlet is smaller than a diameter of the bore.

17. The dispensing system of claim 14 wherein the fluid to be dispensed has a dynamic viscosity ranging from 10,000 centipoise to 100,000 centipoise.

18. A dispensing system, comprising:
a housing;
a product reservoir containing a viscous fluid to be dispensed;
a valve member that when actuated dispenses the fluid product from the reservoir; and
a nozzle assembly, the nozzle assembly comprising:
a nozzle feed tube having a proximal end and a distal end, and having a first longitudinally extending axial bore forming an inlet for a fluid to be dispensed at the proximal end and forming a feed tube outlet at the distal end, the nozzle feed tube further including one or more outlet ports positioned near the distal end of the nozzle feed tube;
a seal plunger having a second longitudinally extending axial bore configured to slidably receive the nozzle feed tube;
a nozzle tip configured to form a nozzle tip cavity and having a nozzle tip outlet, the nozzle tip connected at a distal end of the seal plunger such that the feed tube outlet is slidably movable within the nozzle tip cavity; and
a spring mounted between the seal plunger and the nozzle feed tube biasing the seal plunger to a closed position with respect to the outlet ports in the nozzle feed tube;
wherein the seal plunger and the nozzle tip slidably move in a proximal direction along the nozzle feed tube and into an open position with respect to the outlet ports in the nozzle feed tube in response to application of an actuation force to the nozzle tip; and
a dispenser actuator configured to apply the actuation force to the nozzle tip; and wherein the bore of the nozzle feed tube forms a first flow path through which the fluid flows from the proximal end of the nozzle feed tube toward the distal end of the nozzle feed tube to be dispensed from the nozzle tip outlet, and the outlet ports form an inlet to a secondary flow path through which the fluid flows from the outlet ports through the nozzle tip cavity at a faster flow rate than a flow rate of the fluid through the first flow path to be dispensed from the nozzle tip outlet.

19. The dispensing system of claim 18, wherein the dispenser actuator is a manual dispenser actuator or a touch-free dispenser actuator.

20. The retractable nozzle assembly of claim 1, wherein the secondary flow path has a relatively smaller cross-sectional area than the first flow path when the seal plunger and the nozzle tip are in the open position with respect to the outlet ports in the nozzle feed tube.

21. The retractable nozzle assembly of claim 1, wherein the flow rate of the fluid through the secondary flow path is relatively faster than the flow rate of the fluid through the first flow path when the seal plunger and the nozzle tip are in the open position with respect to the outlet ports in the nozzle feed tube.

* * * * *